United States Patent Office 3,184,966
Patented May 25, 1965

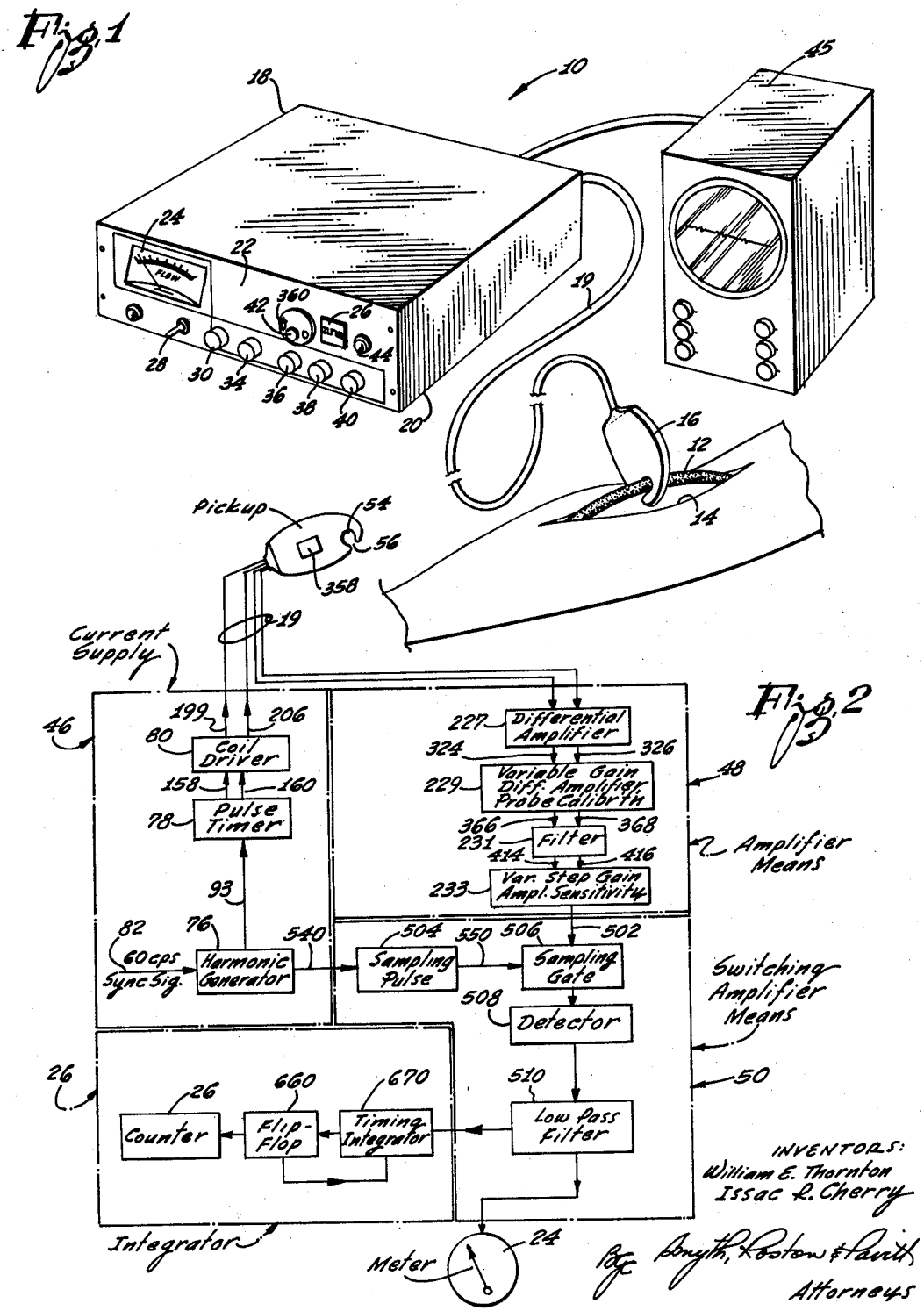

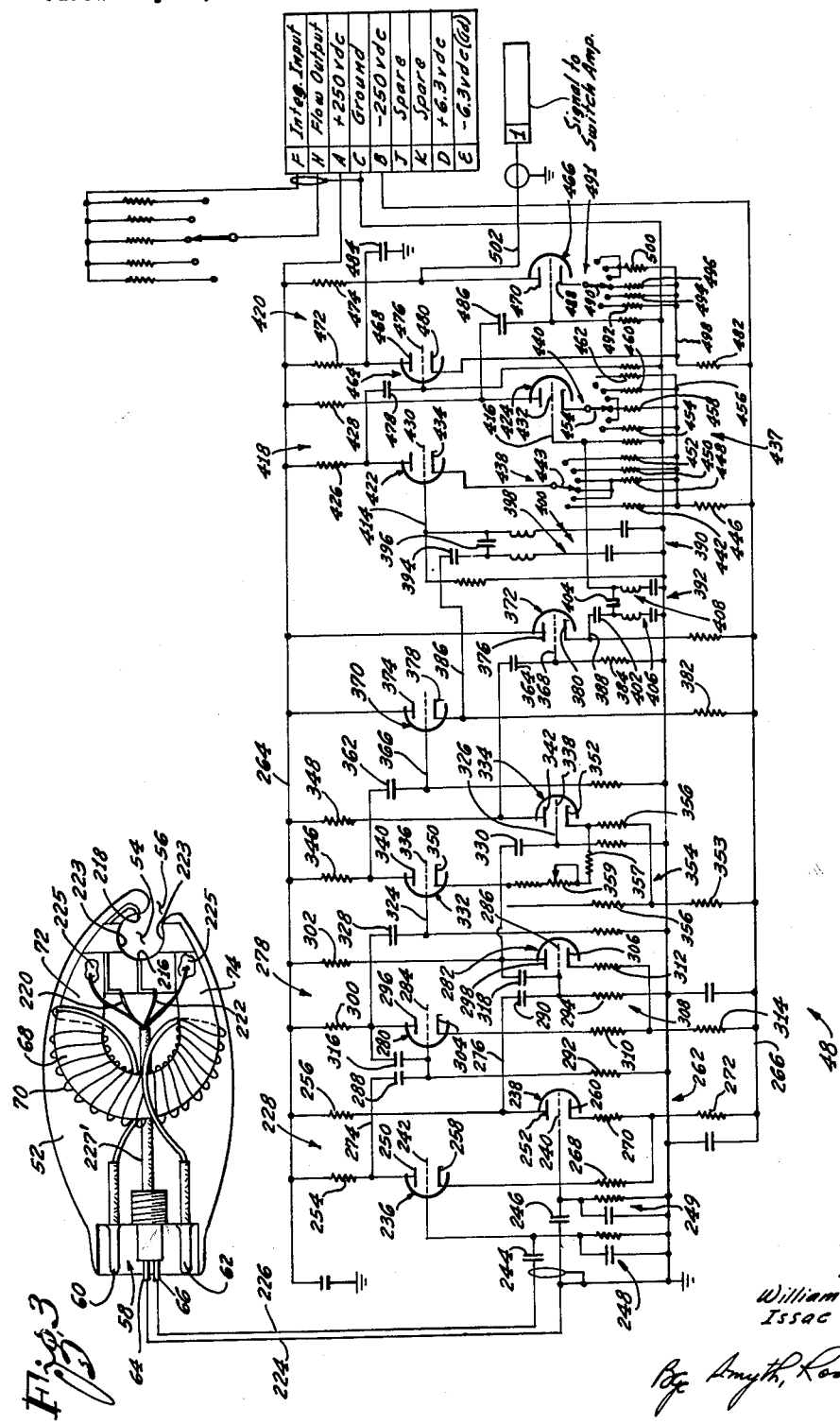

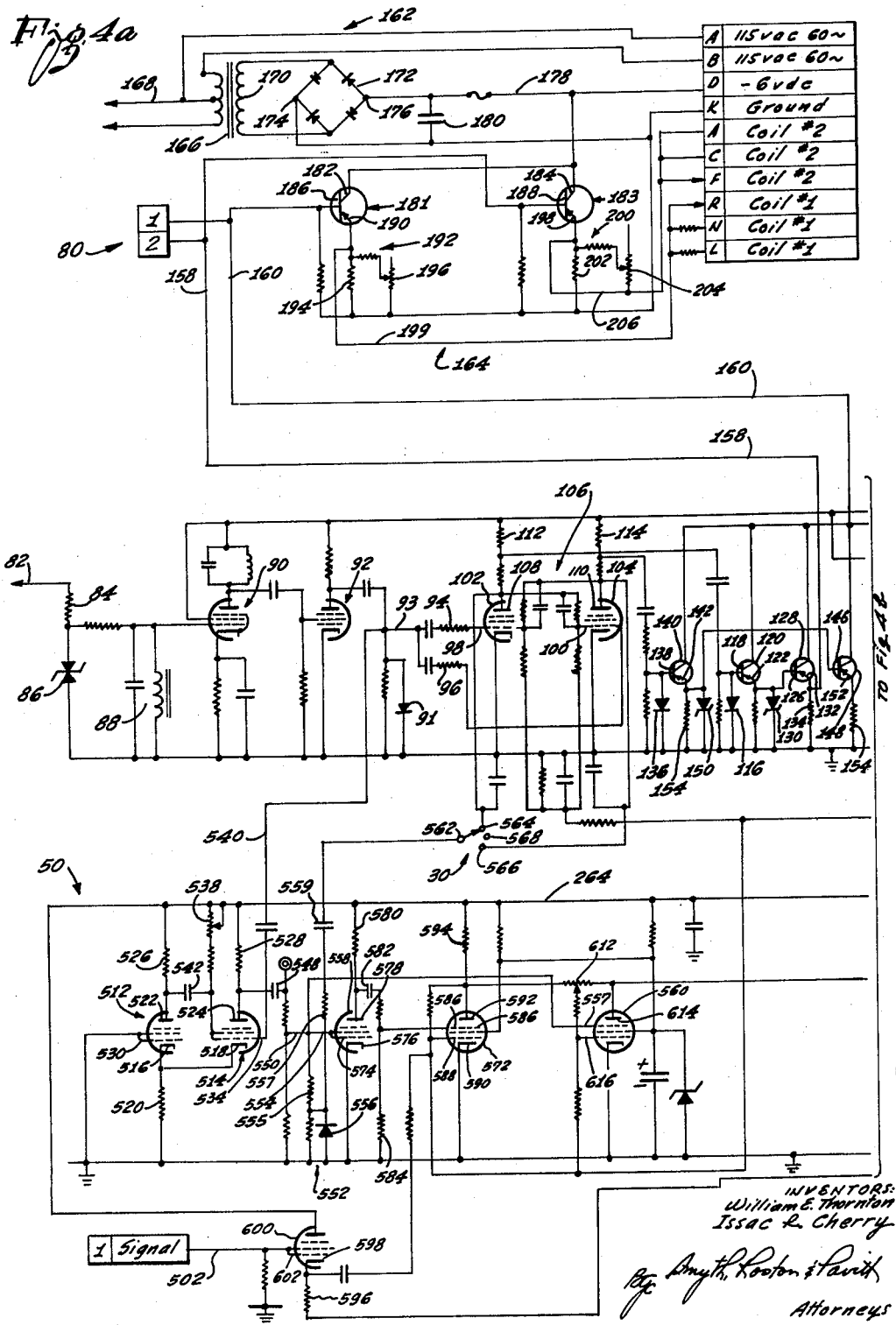

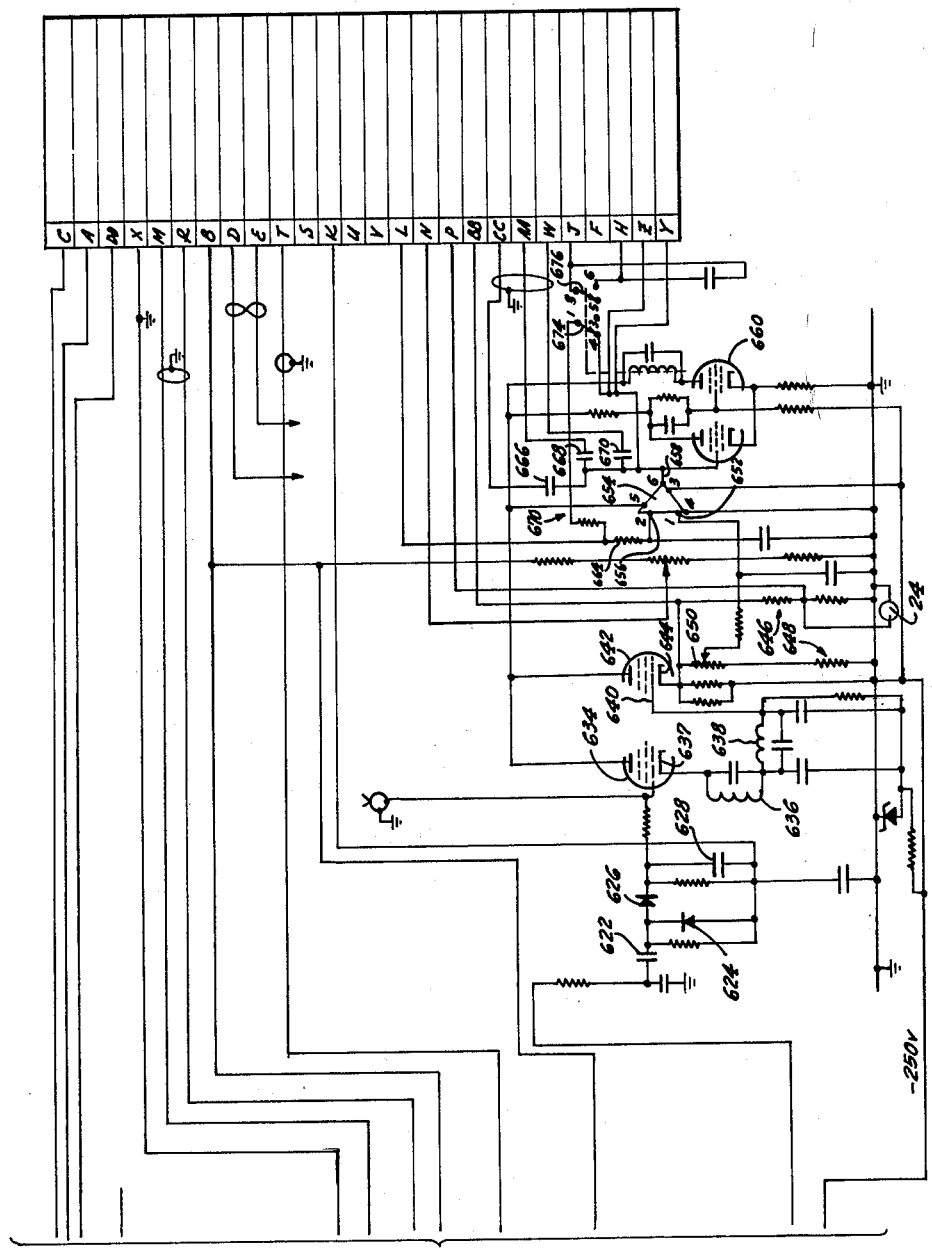

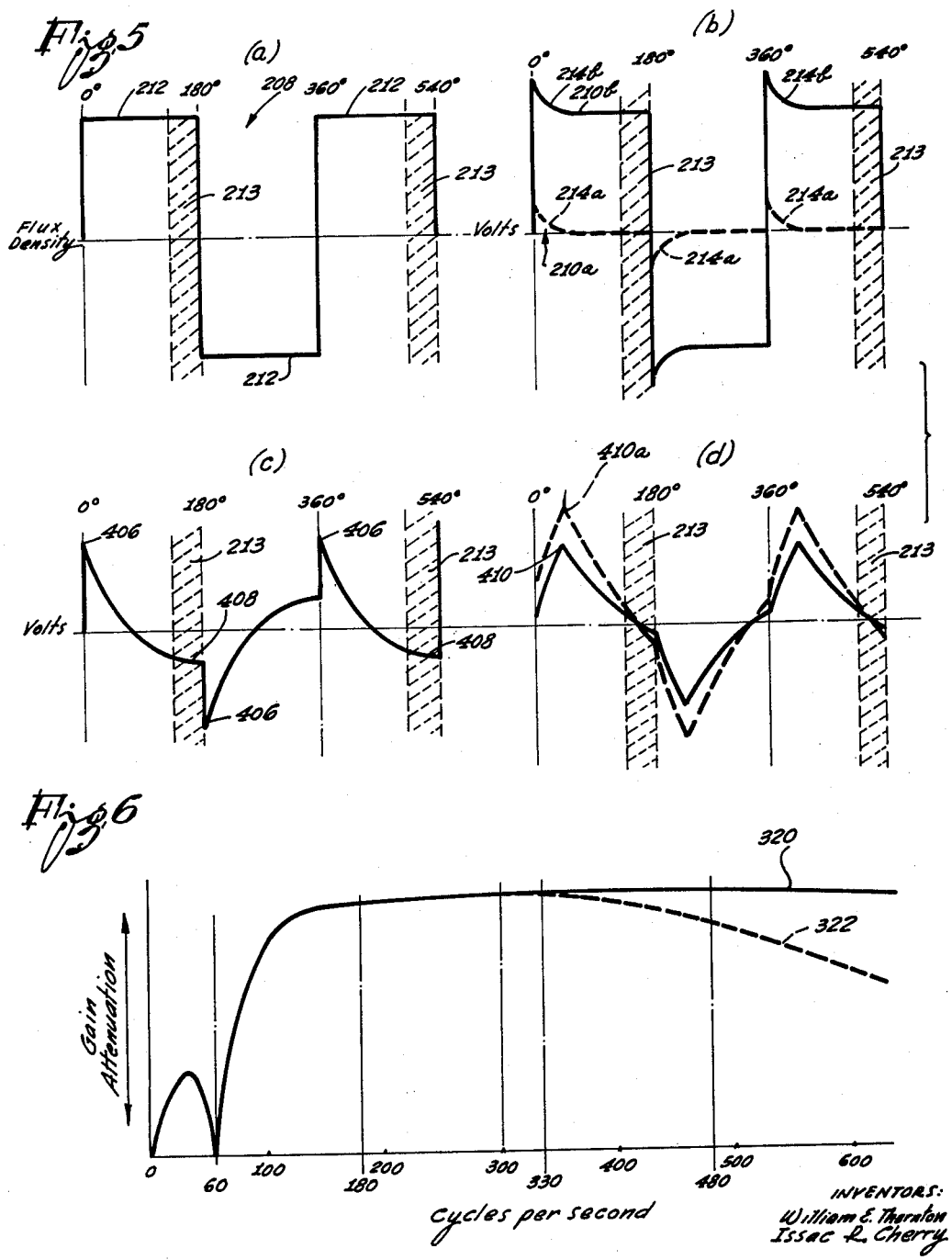

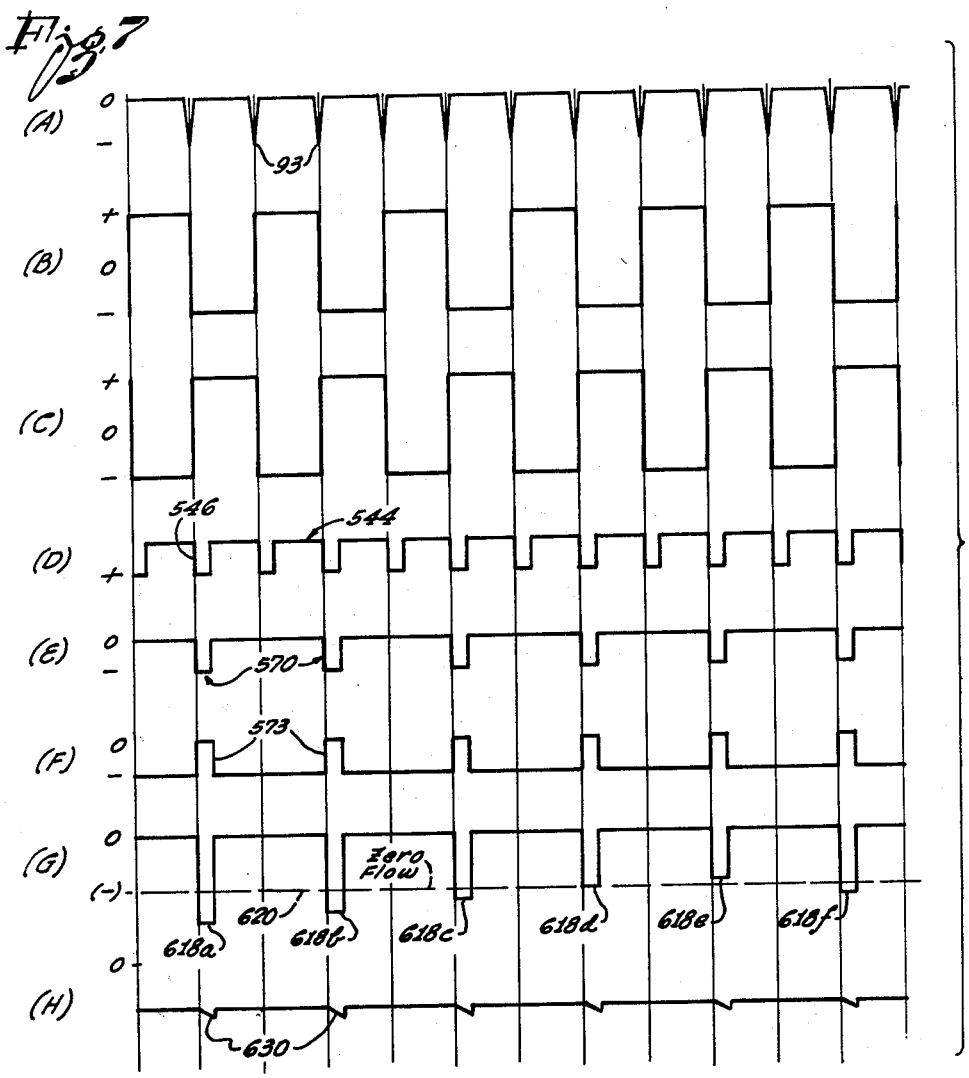

3,184,966
ELECTROMAGNETIC FLOWMETER
William E. Thornton, Chapel Hill, N.C., and Isaac R. Cherry, Torrance, Calif., assignors to Avionics Research Products Corporation, Venice, Calif., a corporation of California
Filed July 13, 1961, Ser. No. 123,767
1 Claim. (Cl. 73—194)

The present invention relates to means for measuring fluid flow through a conduit without opening the conduit or otherwise interfering with the flow through the conduit and more particularly to means for measuring the rate and volume of flow of a fluid such as blood through a conduit such as a blood vessel.

It has been found that when a fluid flows through a magnetic flux field, a voltage will be generated in the fluid that is normal to both the direction of fluid flow and the direction of the magnetic field. The voltage generated will, among other things, have an amplitude that is a function of the intensity of the flux field, and the rate or velocity at which the fluid is flowing through the field. Accordingly, it is possible to measure fluid flow in a conduit without opening the conduit. More particularly, this may be accomplished by providing a pickup probe having a magnetic core with an air gap into which the conduit may be inserted. A driving coil on the magnetic core is then energized so as to create a magnetic flux field through the fluid normal to the direction of flow. A pair of contacts are then provided on the opposite sides of the conduit to sense the amount of voltage generated across the fluid as it flows through the field and to feed the voltage to suitable circuitry to measure the amplitude of the voltage and indicate the flow.

If the magnetic field has a steady amplitude and direction, a D.C. voltage is generated having an instantaneous amplitude directly proportional to the velocity of flow. However, it has been found that when using a steady magnetic field the electrical contacts become polarized due to an accumulation of an electrical charge thereon. In addition, if the voltages generated are very small, as occurs when measuring certain types of flow since the voltages are D.C., it has been virtually impossible to accurately amplify them to a level when this can be accurately measured. As a result, when it is desired to accurately measure the rate of fluid flow, such as the flow of blood in a blood vessel, it has been customary to provide a magnetic field which alternates or periodically reverses its direction frequently enough to prevent polarization of the contacts and to provide an A.C. voltage that is more easily amplified.

Unfortunately, any change in the intensity of the magnetic field changes a counter-electromotive force that tends to obscure the voltage representing fluid flow. To eliminate errors resulting from such counter-electromotive forces, it has been proposed to employ a magnetic flux field having an intensity that periodically reverses its direction but maintains the flux density constant over at least a portion of each cycle. Thus, although each reversal of the flux field will cause the generation of counter-electromotive forces in the fluid, the flux density will remain constant for a sufficient interval of time for the transient voltages generated in the fluid to disappear. As a result, during at least a portion of the cycle when the magnetic field is constant, the voltage generated in the fluid will be directly proportional to the rate of fluid flow. Accordingly, it has been found that by sampling the voltage generated in the fluid only during such portions of the cycles, a pulse train will be provided that has an amplitude that is a function of fluid velocity.

In systems of the foregoing variety, the coil for providing the flux field is enclosed in a pickup probe that may be secured to the conduit in which the fluid is flowing. A square wave current is then supplied to the coil to create a square wave flux field. These square waves must have little or no transients and the rise and fall times must be as short as possible. In the past, the amount of current that could be easily obtained with these characteristics has been small. Accordingly, heretofore it has been necessary to limit the frequency of the flux field to approximately 50 or 60 cycles per second and to employ a pair of coils in the pickup, with current pulses of opposite polarity flowing in the different coils.

In addition, heretofore whenever the flux field reversed its polarity there have frequently been a large proportion of transient signals that have interfered with the accuracy of the measurements. Accordingly it has also been necessary to maintain the frequency of the flux field sufficiently low to permit an adequate period for the transients to completely die out.

Although systems of the foregoing variety have been satisfactory for many applications, it has been found in certain applications, such as measuring the rate at which blood flows through a blood vessel, that numerous problems may be encountered. For example, in order to measure blood flow, it is necessary to place the probe on the blood vessel. This, in turn, necessitates an incision having a size that is to some extent determined by the size of the probe. Since it has been necessary heretofore to employ two coils in the pickup probes, the probes have been excessively large and thereby require a larger incision.

In previous systems of this nature, the driving current in the coil has normally been derived directly from a 60-cycle per second supply line. This results in a flux field that alternates at substantially the same frequency as the line frequency. As a result, electrical equipment such as motors, lights, etc., may cause spurious signals to be induced into the pickup. Also, the muscular contractions, and particularly those in and around the heart, radiate electrical signals in this frequency range that are picked up in the probe. Since these spurious signals have frequencies and magnitudes comparable to the flow signals to be measured, it has been extremely difficult, if not impossible to accurately separate the desired signals from the undesired signals and to accurately measure them. As a result, previous flow meters that have been particularly adapted for measuring blood flow have been extremely difficult to utilize and have required highly skilled operators to obtain optimum results therefrom.

It is now proposed to provide a flow meter that is particularly adapted to measure the flow of a fluid, such as blood, in a blood vessel without the foregoing difficulties. More particularly, it is proposed to provide a flow meter that is not only very accurate and reliable but is also very simple to operate. The flow meter will include a coil that creates a flux field in the blood vessel, a pair of electrodes that contact the blood vessel to sense the voltage thereacross and means for sampling the voltage during each cycle. The means for supplying current to the driving coil is capable of supplying a square wave of current having a frequency which is substantially higher than the line frequency and other sources of spurious signals. In addition the driving current in the coil will have a sufficient amplitude to permit the use of only one coil in the pickup probe. As a result the pickup probe may be much smaller and thereby easier to employ. In addition since the current supply can operate at a frequency higher than the line frequency, filter means are provided for separating the spurious signals from the desired signals so as to insure more accurate measurements. At the same time means are provided that will compensate for effects of any transients that may be present to thereby reduce any errors resulting therefrom. Thus it will be possible for the flux field to alternate at a frequency that is higher that the frequency of spurious signals. In addition, by being capable of reducing the effects of transients the flow meter may be permanently precalibrated so that the measurements will be maintained accurate and consistent.

Due to the increased accuracy and other factors which will become apparent, an integrating means may be provided so that the meter may not only indicate the rate at which the blood is flowing but also the total volume of flow that occurs over an extended period of time.

These and other features and advantages of the present invention will become more apparent from the following description, particularly when taken in connection with the accompanying drawings wherein like reference numerals throughout designate like parts and wherein:

FIGURE 1 is a perspective view of a flow meter embodying the present invention.

FIGURE 2 is a block diagram of the flow meter employed in FIGURE 1.

FIGURE 3 is a cross-sectional view of a pickup probe and a wiring diagram of a portion of the circuitry connected thereto.

FIGURES 4a and 4b are wiring diagrams of the remaining circuitry.

FIGURES 5a, 5b, 5c and 5d are wave forms representing various operating characteristics of the flow meter.

FIGURE 6 is a graph showing the frequency response of the present meter.

FIGURE 7 is a view of several wave forms at various points in the flow meter.

Referring to the drawings in more detail, the present invention is embodied in a flow meter 10 for measuring the rate and/or volume of fluid flowing through a conduit. Although the flow meter 10 may be employed for measuring the flow of any type of conductive fluid through any type of conduit, in the present instance it is particularly adapted to measure the flow of blood in a blood vessel 12 exposed through an incision 14.

The present flow meter 10 includes a pickup probe 16 adapted to be attached to the blood vessel 12 to develop signals indicative of the blood flow together with a control and indicating unit 18 that is operatively connected to the pickup probe 16 by means of a cable 19. The control and indicating unit 18 includes a housing 20 that has a front panel 22 with a meter 24 for indicating the rate of flow, means such as a counter 26 for indicating the volume of flow, and various control means 28 to 44, inclusive, for adjusting the operating characteristics of the meter 10. If desired, an oscilloscope 45 may also be interconnected with the control and indicating unit 18 for visually indicating the manner in which the blood is flowing through the blood vessel 12 and/or the various operating characteristics of the meter 10.

As may be seen from the block diagram in FIGURE 2, the meter 10 includes a current supply means 46 for energizing the pickup probe 16, amplified means 48 that is connected to the pickup probe 16 to amplify the signals therefrom to a more useful level, switching amplifier means 50 that receives the amplified signals and samples and filters the signals suitable for energizing the rate meter 24 and the volume indicator 26.

Although the pickup probe 16 may be of any suitable form in the present instance the probe 16 is essentially identical to the probe 16 disclosed and claimed in copending application 123,768. More particularly, this probe 16 is enclosed in a hermetically sealed housing 52 molded from a suitable plastic. The housing 52 preferably consists of a material, such as epoxy resin, that is very strong and rigid and which may be heated to sufficiently high temperatures to permit sterilizing of the probe 16 without softening the housing 52 or otherwise damaging the pickup probe 16.

The outer end of the housing 52 has a hole drilled therethrough to form a passage 54 having an inside diameter that is slightly less than the outside diameter of the blood vessel 12. An opening 56 may be provided in the end of the housing so that the blood vessel 12 may be fitted into the passage 54 with the exterior surface of the blood vessel 12 in intimate contact with the inner surface of the passage 54.

The opposite end of the pickup probe 16 may be recessed to provide a socket 58 having a pair of male connectors 60–62 and a pair of female connectors 64–66 that are adapted to be connected to a plug on the end of the cable 19.

In order to create a flux field through a blood vessel 12 positioned in the passage 54, a magnetic core 68 and a coil 70 are provided inside of the housing 52. The core 68 consists of a permeable material, such as soft iron, through which the flux will flow. The core 68 has a base portion and a pair of arms 72 and 74 that extend from the base toward the outer end so as to terminate on the opposite sides of the passage 54. Thus, the space between the arms, i.e., the passage 54, forms an air gap through which the flux field passes.

The coil 70 for creating the magnetic flux is wound around the core 68 so that the ends thereof will be connected to the male connectors 60 and 62 so that the coil 70 may be connected to the current supply means 46. Thus, a blood vessel 12 in the passage 54 will be subjected to a magnetic flux field that extends thereacross substantially normal to the direction of flow and will have a density corresponding to the current out of the current supply means 46. In order to facilitate the switching of the currents in the coil 70 and to reduce transients, the inductance of the coil 70 should be as low as possible. Accordingly, the present coil 70 has a small number of turns, for example, in the neighborhood of 25 to 50 turns.

The current supply means 46 for feeding the current to coil 70 includes a harmonic generator section 76 and a pulse timer section 78 and a coil driver section 80.

The harmonic generator 76 includes an input line 82 that is connected to a high-voltage line (approximately 350 volts 60 c.p.s.) that is synchronized with the line frequency. A dropping resistor 84 and Zener diode 86 are connected between the synchronizing line 82 and ground. The Zener level of the diode 86 is sufficiently low (approximately 20 volts) to clip the peaks of the supply signal. This will provide an output that is substantially a 60 c.p.s. square wave having a large amount of harmonic frequencies therein. A filter 88 is connected across the Zener diode 86 and tuned to a harmonic such as 660 c.p.s. whereby the output from the filter will be a 660 c.p.s. sine wave. This sine wave is fed through an overdriven amplifier and integrator stages 90 and 92, respectively. The output from the integrator stage 92 is connected across a diode 91 that will be effective to short all positive signals to ground while leaving the negative ones. Thus, the output at this point will include a wave train having a series of negative "spikes" 93 as seen in FIGURE 7a. These "spikes" will occur at a frequency of 660 c.p.s. and an amplitude on the order of 30 volts. These spikes, which constitute the output from the harmonic generator, will be synchronized time-wise with the line frequency. As will become apparent, these pulses are effective to time the operation of the entire meter 10 so that its operation will occur in a fixed phase relation to the line frequency.

The pulse timer 78 has the input thereof connected to the output of the harmonic generator 76 by means of a conductor 93 to receive the 660 c.p.s. negative "spikes." The input includes a pair of resistor-capacitor coupling networks 94 and 96 that are separately connected to the two control grids 98 and 100 of a pair of triodes 102 and 104 interconnected to form a flip-flop circuit 106. This flip-flop circuit 106 is bi-stable so that the conducting tube may remain conducting indefinitely and vice versa. However, a negative pulse on either grid 98 or 100 will cause the conducting tube to be cut off and the non-conducting tube to be conductive. Thus a train of negative pulses on the grids 98 and 100 will cause the triodes 102 and 104 to alternately conduct. As a consequence if the 660 c.p.s. pulse train is supplied to the grids each of the plates 108 and 110 will be alternately conductive and the plate load 112 and 114 will have a 330 c.p.s. square wave thereon. Each of these square waves will be 180° out of phase with the other square wave.

The plate 108 of the first triode 102 is connected to a D.C. restoring diode 116 and to the base 118 of a transistor 120. The diode 116 is adapted to insure the square wave returning to a zero reference level during each half cycle, i.e., it will clamp the square wave to zero and prevent drifting thereof. The emitter 122 of this transistor 120 is connected to the base 126 of a succeeding transistor 128 and to a Zener diode 130 that is grounded. This diode 130 has a Zener level on the order of 4.0 volts so as to limit the amplitude of the square wave. The emitter 132 of this transistor 128 is connected to ground by means of a load resistor 134. The load resistor 134 will thus have a square wave signal (FIGURE 7b) thereon which alternates between the controlled limits of 0 and 4 volts. This forms one output signal from the pulse timer 78 and will appear on the conductor 158.

The plate 110 of the second triode 104 in the flip-flop 106 is connected to a second D.C. restoring diode 136 and the base 138 of a transistor 140. The emitter 142 of this transistor 140 in turn is connected to the base 146 of a succeeding transistor 148 and to a second Zener diode 150 that is grounded. The emitter 152 of transistor 148 is connected to ground by means of a resistor 154 that forms the load for the transistor 148. This resistor 154 forms the other output of the pulse timer 78 and the signal (FIGURE 7c) thereacross will appear on the conductor 160. The D.C. restoring diode 136 will be effective to "clamp" the base of the square wave signal to ground potential while the Zener diode 150 will limit the voltage to 4.0 volts.

It may thus be seen that since the diodes 116 and 136 will clamp the squares to ground and the Zener diodes 130 and 150 have a cut-off level of approximately 4.0 volts, the output signals across the two resistors 134 and 154 will vary between the preselected and controlled limits of 0 and 4.0 volts or any other limits as are suitable for use with the input to the coil driver 80. Thus the output signals or conductors 158 and 160 will be a pair of square waves having identical amplitudes of 4.0 volts. Since these two waves are triggered by the square waves on the plates 108 and 110, they will be 180° out of phase with each other as can be seen by comparing FIGURE 7b and FIGURE 7c and they will have a frequency of 330 c.p.s.

The coil driver section 80 includes a low-voltage D.C. power supply portion 162 and a current amplifier portion 164. The power supply portion 162 includes a step-down transformer 166 that reduces the voltage on a standard power supply line 168 having a 60-cycle per second voltage of 115 volts down to a voltage on the order of 6 to 8 volts or a level suitable for use as a transistor power supply. The secondary winding 170 is connected to a full wave bridge type rectifier 172 having the positive side 174 grounded and the negative side 176 connected to a D.C. supply line 178. A filter condenser 180 may be connected to the supply line 178 to filter out any line ripples.

The current amplifier portion 164 includes a pair of transistors 181 and 183 that have the collectors 182 and 184 thereof connected to the D.C. supply line 178. The base 186 of the first transistor 181 is connected to the output line 160 from the pulse timer 78 while the base 188 of the second transistor 183 is connected to the second output line 158. The emitter 190 of the first transistor 181 is grounded by means of a resistance network 192 having one arm of fixed resistance 194 and a second arm of variable resistance 196. The emitter 190 is also adapted to be connected to one side of the driver coil 70 in the pickup probe 16 by means of a conductor 199 leading to the cable 19. This transistor 181 will thus operate as a current amplifier that will amplify one of the square wave signals received from the pulse timer 78 to provide square wave pulses of current. The gain of the amplifier or the amplitude of the current may be set to the required amount by adjusting the potentiometer 196.

The emitter 198 of the second transistor 183 is also grounded by means of a resistance network 200 having a first arm 202 with a fixed resistor and a second arm with an adjustable resistor 204. The emitter 198 is also adapted to be connected to the opposite side of the driver coil 70 in the pickup 16 by means of a conductor 206 leading to the cable 19. This transistor 183 will thus operate as a current amplifier that will amplify the other square wave signal received from the pulse timer 78 to provide a second series of square wave pulses of current. The gain of this amplifier is adjusted by means of potentiometer 204 so that the current pulses from the transistors 181 and 183 will be substantially identical. However, since they are triggered from the pulse timer signals the two pulses of current will be 180° out of phase with each other.

It may thus be seen from the foregoing that the current supply 46 operates as follows to cause a square wave of current to circulate through coil 70 to provide a magnetic flux field in the passage 54. The harmonic generator 76 receives a synchronizing signal from the line 82 and feeds a wave train consisting of a series of negative spikes having a frequency of approximately 660 c.p.s. to the input of the pulse timer 78. The networks 94 and 96 in the input to the timer 78 will split the wave train into two separate trains and feed the same to the control grids 98 and 100 in the flip-flop 106. The flip-flop 106 will then provide a pair of square wave signals each of which has a frequency of approximately 330 c.p.s. and is 180° out of phase with the other signals. These square wave signals are then fed over lines 158 and 160 to the bases 186 and 188 in the transistors 181 and 183.

As a result during the first half of each cycle the square wave at the base 186 will be approximately 4 volts negative. At the same time the square wave at the base 188 will be at ground potential. Conversely during the second half of the cycle the square wave at the base 186 will be at ground level and the square wave at the base 188 will be approximately 4 volts negative.

During the first half of the cycle when the base 186 is negative and the base 188 is at ground potential, a current of constant amplitude will flow from ground upwardly through the resistor network 192 over the conductor 199, through the cable 19 and into the driver coil 70. This current will then flow through the coil 70 in one direction, enter the cable 19, flow through the wire 206 to the emitter 198. From here the current will flow through the power supply portion 162 and return to ground. During the second half of the cycle the current will flow from ground upwardly through the resistor network 200, over the conductor 206, through the cable 19 and into the coil 70. The current will then flow through the coil 70 in the opposite direction into the cable 19, over the conductor 199 to the emitter 190. The current will then flow through the transistor 188 to the power supply portion 162 and return to ground.

It may thus be seen that as a result of pulses of oppositely directed currents from the transistors 181 and 183, a current will flow through the coil 70 that will periodically alternate as a symmetrical square wave. Due to the opposing action of the transistors 181 and 183 a large current may be made to flow that will have a very short rise and fall time. This in turn will provide a flux field in the passage 54 that will vary as a square wave that will also have a very short rise and fall time. FIGURE 5a shows a flux density curve 208 that represents the density of such a flux field. The flux density will very rapidly reverse its direction every 180°, i.e., at 0°, 180°, 360°, 540°, etc. In the intervals therebetween the flux density will remain substantially constant at the amount 212. During the interval from 0 to 180° it will be in a positive direction and from 180° to 360° it will be in a negative direction.

The flux density 212 is chosen so that the normal range of velocity of the blood to be measured will produce a voltage that will be of sufficient magnitude to permit the meter to be able to accurately measure it but will be sufficiently low to prevent damage to the blood. In the present instance a signal voltage in the range of a few microvolts has been found to be an acceptable level. The flux density may be expressed in terms of the driving force producing the field, i.e., the ampere turns of the coil 70.

In order to provide a signal larger from the foregoing range on a typical artery, by properly proportioning the core 72, the size of the air gap, etc. the driving force of the coil 70 may be on the order of 250 to 500 ampere-turns. Since the present current amplifier 164 is capable of providing a current pulse in a range of 6 to 8 amperes, the number of turns required for the coil may be in the neighborhood of 25 to 50. A coil of these proportions may be of very small physical size so that it will not cause an excessively large size probe. In addition, it should be noted that since the inductance of a coil varies as the square of the number of turns therein, the inductance of coil 70 may be reduced down to a very small amount. Because the inductance in a circuit controls the rate at which a current may change, the "squareness" of a current square wave or the rise and fall time thereof is a function of the inductance through which it is flowing. It may thus be seen that the current amplifier 164 by being capable of greatly reducing the physical size of the probe 16 will also result in a driving current having a very high degree of "squareness." This in turn will result in a flux field having a corresponding high degree of "squareness." Thus the flux field will be substantially identical to the flux density represented by the curve 208 and will have a minimum amount of transients. It will be noted that during approximately the last 45° or so of each half cycle and particularly the shaded interval 213, the flux density 212 will be virtually constant.

If a flux field such as 208 is present in a fluid, it will cause a voltage similar to that in FIGURE 5b to be generated therein. If the field extends transversely through the blood vessel 12 substantially normal to the direction of flow, the voltage will appear at the opposite ends of a diameter that is substantially normal to both the flux field and the direction of flow. As the blood moves through the field a voltage signal 210a or 210b will be generated that will have an amplitude that is a function of the velocity of flow.

As may be seen from FIGURE 5b, the voltage generated will also have a "spike" 214 that starts a 0°, 180°, 360°, 540°, etc., or at those instances during which the flux field is rapidly reversing its direction. This transient is a counter electromotive force that is capacitively and inductively coupled from the magnet to the pickup probe and it appears as a "spike" 214 superimposed on the voltage signal representing flow rate 210a or 210b. The amplitude of this spike 214 depends upon, among other things, the rate of change of the flux field. However, since the energy in the counter E.M.F. is very low and of very short duration it will rapidly decay to zero during the initial portions of each half cycle. The voltage 210a or 210b that remains after the spike 214 disappears and particularly during the interval 213 will thus be substantially entirely proportional to only the instantaneous flow rate of the blood.

Accordingly, if the blood in the blood vessel 12 is not flowing but is stagnant, the voltage will correspond to the curve represented by the dotted line 210a. More particularly, there will be an initial pulse or spike 214 which will rapidly decay to zero and the voltage will remain at zero for the remainder of the half cycle.

If there is a flow of blood through the blood vessel 212, there will be the initial spike 214b which will decay away to the level 210b. The amplitude of 210b will be proportional to the velocity of flow. It will be noted that for a period corresponding to at least the last 25% of each half cycle the voltage 210 will be substantially free of any transients and an accurate index of the instantaneous rate of flow. Accordingly if the voltage signal 210a or 210b on the opposite sides of the blood vessel 12 is sampled only during the periods 213, the voltage obtained will be correspondingly free of transients and will accurately represent the rate of flow.

From the foregoing it may be seen that if there is a current in the coil 70 and a vessel 12 is disposed in the passage 54 there will be a voltage 210 generated on the opopsite sides of the vessel 12 that will be normal to the flux field and to the direction of flow. Moreover the voltage 210 will have an amplitude, at least during the interval 213, that is a function of the rate of blood flow.

To sense the foregoing voltage, the pickup probe 16 includes a pair of electrodes 216 and 218 that extend through the surface of the passage 54 and intimately bear against the exterior of the blood vessel 12. These electrodes 216 and 218 are preferably of a material, such as gold, which will not tarnish, corrode or otherwise deteriorate.

As is more clearly disclosed in copending application Serial Number 123,768 it may be formed from a piece of bar stock that extends axially of the probe 16 substantially normal to the flux. Thus when the passage 54 is drilled out the stock will be cut into two separate pieces that have the ends thereof flush with the surface of the passage 54. Since the voltages to be measured are on the order of a few microvolts it is essential that the electrodes 216 and 218 and the bar stock from which they are formed are disposed as symmetrically as possible within the magnetic. field. This will prevent the induction of stray signals into the electrodes as a result of the alternating flux field in the air gap.

This in turn will insure the electrodes 216 and 218 being disposed so as to engage the exterior of the blood vessel 12 at the opposite ends of a diameter that is normal to both the direction of flow and the direction of the flux field. Since, as pointed out above, this is the area wherein the signal voltage is generated, the electrodes 216 and 218 will be positioned to accurately sense the signal voltage.

Leads 220 and 222 are connected to each of the electrodes 216 and 218 so as to interconnect the electrodes with the female connectors 64 and 68 in the base of the probe 16. Thus when the cable 19 is connected between the probe 16 and the unit 18 the electrodes will be operatively interconnected with conductors 224 and 226 leading to the input of the amplifier means 48.

In addition, it may be desirable under some circumstances to further reduce spurious signals by providing at least one grounding contact 223 on the surface of the passage 54 for engaging the exterior of the blood vessel 12. In the present instance there are four contacts that are formed by securing a pair of bars, of gold or similar material, onto the sides of the pole pieces. Thus when the passage 54 is drilled it will also provide two pairs of contacts that will engage the exterior of the blood vessel 12 in quadrature to the electrodes 216 and 218. These contacts will engage the blood vessel 12 parallel to the lines of flux and midway between the pickup electrodes 216 and 218.

Thus, if the contacts 223 are electrically connected to the core 68, they will not interfere with the signals to be measured but they will tend to ground out all spurious signals present on or in the blood vessel. Since the voltages involved are of such small amplitudes, it is sometimes advisable to also provide a direct connection from the electrodes 223 to the grounding shield 227'.

As previously stated the two female connectors 64 and 66 in the base of the pickup probe 16 are connected to the electrodes 216 and 218 by the leads 220 and 222 and are adapted to be connected to the cable 19 leading to the two conductors 224 and 226 in the input to the amplifier means. The cable 19 and conductors 224 and 226 are preferably enclosed in a grounded shield 227' to reduce the pickup of spurious signals therein.

The amplifier means 48 includes a fixed gain differential amplifier 227, a variable gain differential amplifier 229 that is effective to calibrate the meter 10 to the particular pickup probe 16 being employed, a filter 231 and a variable step gain differential amplifier 233 that is effective to vary the sensitivity of the meter to particular rate of flow that is to be measured.

The input to the amplifier means 48 comprises the fixed gain differential amplifier 227 having a first stage 228 of differential amplification. This stage 228 includes a pair of suitable vacuum tubes such as substantially identical triodes 236 and 238. Each of the triodes 236 and 238 has the control grids 240 and 242 respectively connected to a coupling condenser 244 and 246 that will permit A.C. signals to pass therethrough but will effectively isolate the differential amplifier means 48 from any stray D.C. signals present in the electrodes 216 and 218 or cable 19. The control grids 242 and 240 are also grounded by a pair of resistance capacitance networks 248 and 249 respectively. The plates 250 and 252 of each triode 236 and 238 are connected to a positive high voltage D.C. plate supply line 264 by means of precision load resistors 254 and 256. The cathodes 258 and 260 of each of the triodes 236 and 238 are connected to a resistive feedback circuit 262 that is connected to a negative high-voltage supply line 266. The feedback circuit 262 includes a pair of identical resistors 268 and 270 that have their lower ends tied together and to a resistor 272 leading to the low-voltage line 266. The upper ends of the resistors 268 and 270 are connected to cathodes 258 and 260.

This stage 228 will thus act as a differential amplifier having two channels that cooperate with each other so as to tend to amplify only the difference between the two signals on the input conductors 224 and 226. The gains of each channel in this stage 228 is determined by the ratios between the resistance of the plate loads 250 and 252 and the resistance of the cathode loads 268 and 270 respectively. Thus, the gains will be determined by the precision with which the resistors are balanced and will be substantially independent of any unbalance which may be present between the triodes 236 and 238. As a result, if the characteristics of the triodes 236 and 238 vary from aging or from any other causes, each of the channels will still have virtually identical gains. The gain of this stage 228 is preferably fixed and on the order of about 10 to 1.

It should be noted that, as a general rule, a large majority of the spurious signals induced in the pickup probe 16 and conductors 224 and 226 from surrounding electrical equipment, such as lighting fixtures, motors, etc. will be substantially equal in both conductors 224 and 226. Also, any signals that may be received as a result of muscular activity, i.e. the heart, etc., will also normally be substantially equal in both conductors 224 and 226. Accordingly by employing differential amplification the spurious signals will not be appreciably amplified. However, the signal voltage sensed by the electrodes 216 and 218 will be amplified by an amount corresponding to the gain of the stage 228. Accordingly, this stage 228 will not only be effective to increase the signal strength but it will also be very effective to provide a large increase in the signal-to-noise ratio.

The output lines 274 and 276 from each channel of the first stage 228 is connected to the inputs to the next stage 278 of a virtually identical differential amplifier having two separate channels. Each channel includes a suitable vacuum tube such as a triode 280 and 282. More particularly, the lines 274 and 276 lead from the plates 250 and 252 of the triodes 236 and 238 to the control grids 284 and 286. The lines 274 and 276 preferably include condensers 288 and 290 to couple the A.C. signal therethrough but to block the D.C. Each of the grids 284 and 286 are connected to ground by a resistor 292 or 294. The plates 296 and 298 of each triode 280 and 282 is connected to the plate supply line 264 by means of plate load resistors 300 and 302 respectively. Each of the cathodes 304 and 306 is connected to a resistance feedback network 308 that includes a pair of interconnected resistors 310 and 312 and a common resistor 314 that leads to the negative voltage supply line 266. The gains of each channel in this stage 278 of amplification will be determined primarily by the ratios of the resistances of the cathode loads 310 and 312 and the resistances of the plate loads 300 and 302 so that each of the two channels will still be balanced virtually independent of the relative characteristics of the two triodes 282 and 284. The gain of this stage 278 is also permanently set and is on the order of 10 to 1.

Up to this point the first and second stages 228 and 278 are essentially identical structurally and operationally, however, each channel in the second stage 278 may also include a feedback condenser 316 and 318 which is connected between the plates 296 and 298 and the control grids 284 and 286. These condensers are substantially identical to each other and provide degenerate or negative feedback that will tend to decrease the gain of this stage 278. Each condenser 316 and 318 preferably has an adequate capacity to couple the higher frequencies back into the grid circuits so as to materially reduce the high frequency response of the entire stage.

Referring to FIGURE 6, the over-all gain of the amplifier means 48 without the condensers 316 and 318 would correspond to the solid line 320. However, with the condensers 316 and 318 the higher frequencies will preferably be attenuated substantially as indicated by the dashed line 322. As will become apparent subsequently in connection with the explanation of FIGURE 5d and the filter 231, these condensers reduce the high frequency response of the amplifier means 48 to compensate for the decrease in low frequency response produced by the filter 231 and as illustrated by the portion of line 322 below about 180 c.p.s. This will permit the meter 10 to have a so-called electrical zero.

The output signals from the differential amplifier 227 will be obtained from the plates 296 and 298 of the triodes 280 and 282. These signals will be coupled onto the conductors 324 and 326 by means of the condensers 328 and 330.

The differential amplifier 229 is similar to the two preceding stages 228 and 278 of amplification in that it also includes a pair of triodes 332 and 334 or other suitable tubes that are adapted to provide two separate channels that will further amplify the differences between the signals in the channels. However, the gain or the extent to which this difference is amplified is not fixed at a preselected amount but instead may be manually adjusted by means of the control knob 42 on the front panel 22.

The control grids 336 and 338 of the triodes 332 and 334 are connected to the conductors 324 and 326 while the plates 340 and 342 are connected to the positive supply line 264 by load resistors 346 and 348.

The cathodes 350 and 352 are connected to the negative D.C. supply 266 line by means of a resistive feedback network 354. This network 354 includes a pair of fixed resistors 356 that have the upper ends connected to the cathodes 350 and 352 and the opposite ends connected together and to another fixed resistor 353 which has the opposite end connected to the negative voltage line 266. The network 354 also includes a variable resistance line 357 that extends directly between the two cathodes 350 and 352 so as to control the amount of feedback within the amplifier 229. This line 357 includes a potentiometer 359 that has the movable contact thereof operatively interconnected with the probe calibration control knob 42 on the front panel of the unit 18. The resistance of the line 356 will control the feedback between the two channels and will therefore be effective to control the amount of gain of this stage.

As a result it will be possible to calibrate the gain of the meter 10 to correspond to the sensitivity of the pickup probe 16 that is being employed. Accordingly, at the time the probes 16 are manufactured, they may be examined to check their characteristics to determine the sensitivity thereof. More particularly, with a standard current flowing in the coil 70 and a fluid flowing through the passage 54 at a known velocity, the voltage between the two electrodes 216 and 218 are measured. An index or calibration number 358 may then be permanently and conspicuously placed on the side of the pickup probe 16. Thus if the resistance, etc. of the cable 19 is standardized and the knob 42 is adjusted to provide the same number on the dial 360 as the number 358 on the probe 16, the gain of the meter 10 will correspond to the sensitivity of the probe 16 being employed at that time. Thus when the setting on dial 360 matches the number 358, the amplitude of the output signals from this stage will be calibrated so as to always have a predetermined and fixed relation to the rate of flow of the blood through the blood vessel 12.

The output signals from this amplifier 229 will appear on the plates 340 and 342 and are coupled to the inputs of the filters 231 by means of the condensers 362 and 364 and conductors 366 and 368. The input to the filter 231 includes a pair of triodes 370 and 372 that have their plates 374 and 376 connected directly to the D.C. supply line 264 while the cathodes 378 and 380 are connected to the negative supply line 266 by means of cathode load resistors 382 and 384. The signals are taken from the resistors 382 and 384 by means of conductors 386 and 388 that lead to a pair of substantially identical filter networks 390 and 392.

These triodes 370 and 372 will thus act as a differential cathode follower with a fixed gain on the order of about 0.9 to 1.0. However, they will be effective to match the output impedances of the amplifier 229 to the input impedances of the filter networks 390 and 392.

The first filter network 390 is connected to the conductor 386 and includes a pair of condensers 394 and 396 that are connected in series with the transmission of the signals. In addition a pair of series resonant circuits 398 and 400 extend from the condensers 394 and 396 directly to ground. The second filter network 392 is connected to the conductor 388 and includes a pair of condensers 402 and 404 and a pair of resonant circuits 406 and 408 that are arranged to be virtually identical to the first filter network 390. The serial condensers 394, 396, 402 and 404 have an adequate capacity to present a small impedance to signals having frequencies equal to the driving frequency of 330 cycles per second or in the side bands of plus or minus approximately 150 cycles per second. Thus, signals having frequencies of at least 180 cycles per second will be passed through the filter 231 with little or no attenuation. As may be seen from the solid line in FIGURE 6, the attenuation in the band widths will be substantially constant. However, since the impedance of the condensers 394, 396, 402 and 404 increases as the frequency decreases, as may be seen from FIGURE 6, at around frequencies of 100 cycles per second and lower the impedances will be large enough to produce very large attenuation of the signals. In addition, the serially resonant circuits 398, 400, 404 and 408 are preferably resonant at the frequency of the power supply line or around 60 cycles per second. Thus, these circuits 398, 400, 404 and 408 will amount to a virtual short to ground for signals at this frequency.

The over-all response of the pickup probe 16, the amplifier 227, the amplifier 229 and the filter 231 is illustrated by the solid line 320 in FIGURE 6 unless the electrical zero condensers 316 and 318 are employed, in which event the higher frequency response will correspond to the dotted line 322. From this curve it may be seen that in the band width from 180 cycles per second to 480 cycles per second (330 c.p.s. ±150 c.p.s.) the gain will be more or less constant. However, as the frequency decreases below 180 cycles per second there will be an increasing amount of attenuation and particularly at and around 60 cycles per second. Practically all of the spurious signals that may be picked up by the pickup probe 16 will be received from low frequency sources such as the muscular activity and EKG in the immediate vicinity of the probe and from the surrounding electrical equipment that is operating at line frequency. Practically all of these signals have frequencies that are less than 100 cycles per second, at the same time the flow signals will be carried on the 330 c.p.s. pulses and will be within the band width of 180 to 480 c.p.s. Accordingly, the flow signals will be subject to little or no attenuation. It may thus be seen that the combination of the differential amplification and filter means will be very effective to suppress the noise and thereby greatly increase the signal-to-noise ratio.

As a result of the filter 231 greatly reducing the low frequency response of the system, the ability of the system to pass a signal such as the wave train consisting of pulses 210 in FIGURE 5b will be adversely affected. More particularly, the fundamental and other low frequency portions of the "square wave" will be suppressed. The signal will be distorted as a result of so-called "droop," and the voltage will tend to initially "undershoot" the level at which it should be. Thus if a signal such as signal 210a is filtered by the filter 231 the signal will be distorted into the form shown in FIGURE 5c. The "spike" 214 may pass through the filter 231 because the high frequency portions are not suppressed and the filtered signal will still have a "spike" 406. This "spike" 406 will decay away down to a negative amount 408 that may eventually return to zero. However, during the sampling interval 213, the signal will not be zero as in signal 210a, but instead will have a negative value that would correspond to a negative or reverse flow. The amount of this signal will be predominantly a function of the height of the "spike" 406. Since this height is largely a random value, the amplitude of the signal in the interval 213 will be largely unpredictable. As a consequence sampling such a signal during the interval 213 will not insure an accurate result.

In order to eliminate errors resulting from "droop" produced by inadequate low frequency response, the remaining portions of the response signal may be tailored to compensate therefor. This may be accomplished by decreasing the high frequency response from the solid line 320 of FIGURE 6 to correspond to the dashed line 322. As set forth before, in the present instance this is accomplished by providing the electrical zero condensers 316 and 318 between the plates 296 and 298 and grids 284 and 286 of the triodes 280 and 282 in the second stage 278 of differential amplification. These condensers 316 and 318 will be effective to provide a negative feedback that increases with the frequency. Thus, as the frequencies of the signals increase beyond the limits of the upper side band there will be a very large amount of attenuation.

When the high frequency response decreases the rise and fall time of the square wave will increase. As a consequence a "spike" will not rise instantly but instead will require a period of time to reach its peak. Thus, if the signal 210a is distorted by inadequate low frequency responses produced by the condensers 316 and 318, it will appear substantially as shown in FIGURE 5d.

More particularly, the rise time of the "spike" 214 will be lengthened to displace the peak 410 time-wise so that there will be a phase delay of several degrees. The "spike" 410 will then decay at a rate similar to that in FIGURE 5c as a result of the "droop" produced by filter 231. The "spike" 410 will thus fall away to a negative value as before. However, although the amount that it goes negative may still be random. The point at which it crosses the zero line will be substantially constant, and if the high frequency response is properly balanced against the low frequency response it may be made to cross the zero line substantially constant, and if the high frequency response is properly balanced against the low frequency response it may be made to cross the zero line substantially in the middle of the sample interval 213. Thus even if the height of the "spike" 410 should rise to correspond to the dashed line 410a it will still decay across the zero line at virtually the identical point in the cycle, i.e., the middle of the interval 213. As a consequence, the areas above and below the zero line in the interval 213 will be substantially identical. This in turn will result in the signal 210a always producing a zero reading during the interval 213 irrespective of the heights of "spike" 214 or 410.

It may, therefore, be seen that by carefully balancing the feedback characteristics of the condensers 316 and 318 against the attenuating characteristics of the filter 231, an electrical zero may be provided. The practical aspects of this effect are extremely important. For example, the sensitivity of the probe 16, the inductance of coil 70, relative movement between the probe 16 and the blood vessel 12 or other factors that might unpredictably alter the heights of the "spikes" will have little or no effect on the indicated readings. This in turn will mean that once the meter 10 has been provided with means such as the potentiometer 357 that permits calibrating the meter 10 to the probe 16, it is possible for the meter 10 to be placed in service and give consistent and accurate readings.

The output signals from the filter 231 which are similar to those in FIGURE 5d will appear on the output lines 414 and 416. These lines 414 and 416 are connected directly to the input to the amplifier 233. This amplifier 233 consists of two separate stages 418 and 420 which are similar to each other and to the preceding stages. The first stage 418 includes a pair of triodes 422 and 424 that have the plates thereof connected to the positive D.C. supply line by a pair of plate load resistors 426 and 428 and the control grids 430 and 432 thereof connected directly to the output lines 414 and 416. The cathodes 434 and 436 are connected to a resistance network 437 that include two banks 438 and 440 of a ganged step switch 36. More particularly cathode 434 is connected to the rotor 443 in the bank 438.

The first contact in this section 438 is connected to a fixed precision resistor 442 that has the lower end thereof connected to another resistor 446 in the network 437. The lower end of the resistor 446 leads to the negative D.C. supply line 266. The second, third and fourth contacts are all connected together and to a resistor 448 leading to the resistor 446. The fifth and sixth contacts are connected respectively to resistors 450 and 452 that lead to the resistor 446.

The cathode 436 of the next triode 424 is connected to a second rotor 454 in the switch 36 that is ganged with the first rotor 443 so as to rotate therewith. The first stationary contact of this bank 440 of the switch is connected to a resistor 454 that leads to the junction 456 and has a value equal to the resistor 442. The second, third and fourth contacts are all connected together and to a resistor 458 that leads to the junction 456. This resistor 458 is identical to the resistor 448. The fifth and sixth contacts are each connected to resistors 460 and 462 that are identical to the resistors 450 and 452 respectively.

The gain of this stage 418 is determined by the ratio between the plate loads 426 and 428 and the cathode loads selected by the position of the rotors 443 and 454. The rotors 443 and 454 are mechanically connected to the control knob 36 on the front panel 22. It must be seen that by manually positioning the knob 36 the amount of gain of the stage 418 may be adjusted. However, since the second, third and fourth contacts in each bank 438 and 440 are all connected together, the gain of the stage 418 will remain constant for all three positions of the knob 36. If each of the corresponding resistors have identical resistances, the gains in the two channels will remain balanced for all positions of the rotor 443 and 454.

The second stage 420 includes a pair of substantially identical triodes 464 and 466 that have the plates 468 and 470 thereof connected to the positive supply line 264 by means of a pair of substantially identical plate load resistors 472 and 474. The control grid 476 of the first triode 464 is coupled to the plate of the triode 422 by means of the condenser 478 while the cathode 480 is connected directly to the negative supply line by means of the resistor 482. The plate 468 is also coupled to ground by means of a condenser 484 that has adequate capacity to shunt any signals present in the plate circuit directly to ground.

The control grid of the second triode 466 is connected to the plate of triode 424 by means of a condenser 486 that will be effective to couple the signal from the triode 424 into the triode 466. The cathode 488 is connected to a third rotor 490 in a third bank 491 of the switch 36. The rotor 490 is connected to the control knob 36 and is adapted to ride against five stationary contacts, the first, second and third of which are connected respectively to first, second and third resistors 492, 494 and 496 that are all connected to a junction 498 at the upper end of the grounding resistor. Each of these resistors have different amounts of resistances. The fourth, fifth and sixth contacts are all connected together and to a common resistor 500 that leads to the junction 498. Since the gain is determined by the ratio of the cathode and plate loads, the gain of this channel will be determined by means of the position of the rotor 490. An amplified signal will thus appear on the plate load 474 and will be fed into the conductor 502 wihch leads between the amplifier means 48 and the switching amplifier 50.

The rotors 443, 454 and 490 are all mechanically connected to the control knob 36 so that the operator can manually adjust the position of the rotors 443, 454 and 490 to engage preselected sets of contacts. By rotating the rotor the gain of the amplifier 233 may be varied in finite or discrete steps. As pointed out before, the amplitude of the signals and the input to the amplifier 233 will always be in some predetermined or fixed relation to the rate of flow. Thus, by varying the gain of the amplifier 233, the overall sensitivity of the meter can be varied to insure the reading on the meter being a major scale reading to thereby insure an accurate one.

The switching amplifier means 50 includes a sampling pulse generator 504, a sampling gate 506, a detector 508 and a low pass filter 510. The sampling pulse generator 504 comprises a pair of vacuum tubes 512 and 514 which have the cathodes 516 and 518 thereof connected to each other and to ground by a resistor 520. The plates 522 and 524 are connected to load resistors 526 and 528 which lead to the positive D.C. supply line 264. The control grid 530 of the first tube 512 is connected directly to ground by means of a conductor 532 so that the bias on the grid 530 will be a function of the voltage produced across the resistor 520 by the total of the currents flowing through the two tubes, 512 and 514. The control grid 534 of the second tube 516 is connected to the plate 522 of the first tube 524 by a condenser 536 and to the positive D.C. supply line 264 by an adjustable resistance 538. The control grid 534 is also connected across the diode 91 in the output harmonic generator 73 by the conductor 540. The grid 534 will thus receive the pulse train from the generator which, it will be remembered, comprises a train of negative going pulses or "spikes" 93 which amplitudes of approximately 30 volts and a frequency of 660 cycles per second.

It may thus be seen that the two tubes 512 and 514 will operate as a one-shot multivibrator with the second tube 514 normally being conductive. The voltage 544 (FIGURE 7d) on the plate 524 will thus be less positive than the supply line 264 by an amount equal to the drop across the load 528. However, each time a negative pulse 93 from the diode 91 appears on the grid 534, the second tube 534 will be momentarily biased beyond cut-off and will become non-conductive. Since there will be no current flowing through the resistor 528, the plate voltage 544 will instantly rise to supply line voltage. At the same instant the tube 512 will become conductive and the plate voltage will drop. This in turn will result in the condenser 542 holding the tube 514 cut-off until it can be charged through the adjustable resistor 538 at which time the first tube 512 will cut-off and the second tube 514 will conduct and the plate voltage will fall to a less positive level.

It may thus be seen that the plate voltage 544 on the second tube 514 will be a square wave which will have a positive peak equal to the voltage on the supply line and a negative going pulse 546 which decreased therefrom by an amount equal to the drop across the load 528.

The period of time that the voltage on the plate is at line potential will depend upon the time constant of the R-C circuit including the condenser 542 and the potentiometer 538. By a proper choice of the setting of the potentiometer 538 and the capacity of the condenser 542, the period which the tube 514 is not conducting may be made just sufficiently long to cause the tube 514 to conduct for a period suitable for sampling or gating the flow signal. In the present instance where the flux field alternates at 330 cycles per second, the pulse 546 may have a duration of approximately 400 microseconds. It may thus be seen that the signal on the plate of the tube will in essence be a square wave or pulse train 544 consisting of a series of negative going pulses 546 of approximately 400 microseconds duration occurring at the rate of 660 cycles per second.

This pulse train 544 is coupled from the plate 524 by a condenser 548 and a conductor 550 which leads to one input of the sampling gate 506. Since the condenser 548 will isolate the D.C. potential, only a series of negative pulses of 400 microseconds and 660 cycles per second frequency will be on the conductor 550. This conductor leads to a resistor-diode gating network 552 and to the grids 554 and 616 on inverter and balance tubes 558 and 560.

The gating network 552 includes a plurality of voltage-dividing resistors 555 and a diode 556 which extends across one resistor to ground. The diode 556 is also connected to a resistor 557 and condenser 559 which lead to the movable contact 562 in a three-position forward-reverse switch 30 in the front panel 22.

One of the fixed contacts 564 in the switch 30 leads to the plate 108 of the first tube 102 in the flip-flop 106 while the other contact 566 leads to the plate 110 of the second tube 104. It may be remembered that the output from the plates of these two tubes 102 and 104 comprises a pair of square waves in FIGURES 7b and 7c which have a frequency of 330 cycles per second and are 180° out of phase with each other. A neutral contact 568 may also be provided. By placing the movable contact 562 of the switch 30 against one fixed contact 564, a series of square waves at 330 cycles per second may be applied across the diode 556. This square wave, which may be FIGURE 7b, will in effect short out every other one of the negative pulses 546 supplied to the voltage divider by the pulse generator 504. As a consequence, only every other pulse will be permitted to pass on into the sampling gate 506. This wave is shown in FIGURE 7e and consists of a series of negative pulses 570 which occur at 330 cycles per second and correspond phasewise and timewise with the sampling period 213. This wave train (FIGURE 7e) is fed to the control grids 554 and 616 of the tubes 558 and 560. If the movable contact 562 of the switch 30 is moved to the other fixed contact 566, the square wave 570 applied across the diode 556 will be derived from the other tube 104 in the flip-flop 106 and will be shifted by 180°. Thus, by moving the movable contact 562 of the switch, it is possible to select the alternate sets of negative pulses between FIGURES 7b and 7c which will pass through the gating network 552. In other words, it will be possible to switch the sample pulses 180° with respect to the flux field 203 in the air gap. If the arm 562 is placed on contact 568, no sampling pulses will occur and the meter 10 will indicate zero flow.

The sampling gate 506 includes the inverter vacuum tube 558, a signal gating tube 572 and the balance tube 560. The inverter tube 558 has the control grid 574 thereof connected to the voltage-dividing network 554, the cathode 576 connected directly to ground and the plate 578 connected to the D.C. supply line 264 by means of load resistor 580.

The plate 578 of the tube 558 is coupled by means of a condenser 582 to a voltage-dividing network 584. The center point of this network 584 is in turn connected to a suppressor grid 586 in the signal gating tube 572. The inverter tube 558 will be effective to receive the wave train of FIGURE 7e on the grid thereof and invert it into the wave train of FIGURE 7f. This inverted wave train will consist of a series of positive going pulses 573 which rise to zero potential and in between the voltage will go negative beyond a cut-off level.

The tube 572 may be a pentode which has a control grid 588 that is effective to control the flow of current through the tube 572 and a grid such as a suppressor grid 586 that is capable of completely cutting off the tube 572 when it is driven sufficiently negative. The cathode 590 of the gating tube 572 is connected directly to ground while the plate 592 is connected to a load 594 leading to the D.C. supply line 264.

The control grid 588 is connected across a resistor 596 in the cathode 598 of a tube 600 connected to function as a cathode follower. The control grid 602 is connected to the output line 502 from the amplifier means 48. The cathode follower will thus act as an input to the sampling gate 506 and receive the amplified flow signal form the amplifier means 48. Although the follower may have a gain less than 1.0, it will be effective to match impedances and efficiently feed the signal to the control grid 588 of the gating pentode 572.

It may thus be seen that the pulse train of FIGURE 7e, which consists of a series of negative pules at 330 cycles per second, will be fed through the inverter tube and applied to the suppressor grid 586 of the tube 572 as a series of positive going pulses of 330 cycles per second. The tube 572 will thus be normally biased beyond cut-off except for the duration of the pulses 573. During this interval, which is the gating period 213, the gating tube 572 will conduct. During this period the flow signal of FIGURE 5d present on the control grid 588 as supplied from the cathode follower 600 will be effective to control the flow of current through the tube 572. The flow signal will thus be "gated" through the tube 572 and appear on the plate 586. During the remaining period the inverted pulse from the inverter tube 558 and present on the suppressor grid 586 will cut-off the tube 572 so that no flow signal will be present on the plate 592.

Since the pulse generator 504 is triggered from the harmonic generator 76, the sampling pulse will be synchronized or "locked in" with the flux field and will occur during the shaded intervals 213 in FIGURES 5a to 5d. As may be seen in FIGURE 5b, this will be during a period when the transients in the flow signal have disappeared.

When the gating tube 572 is conducting it will draw sufficient current to cause a substantial voltage drop across the load resistor 594, i.e. on the order of a hundred volts.

Thus, by alternately conducting and cutting-off, this tube 572 will tend to produce a square wave signal which will be of sufficient amplitude to cause extreme difficulty in accurately measuring the flow signal. Accordingly, the balancing gate 560 is placed in parallel to the gating tube 572. The suppressor 556 of the tube 560 is connected to the output of the pulse generator 504 to receive the original train of negative pulses 570 of FIGURE 7e. It may be seen that during the extended intervals when the gating tube 572 is cut-off, the second tube 560 will conduct and vice versa. Thus, if the two tubes are identical, the average current through the load resistor 594 will be constant and the flow signal will cause the only fluctuation thereacross.

Since the tubes 560 and 572 cannot be perfectly balanced because of aging, manufacturing tolerances, etc., a variable resistance 612 is interconnected between the plate 614 and the control grid 616 to feed back a predetermind amount of signal to provide a bias on the grid 616 which will insure a predetermined amount of unbalance between the two tubes 560 and 572. The resistor 612 will be effective to function as a course metering zero, as will become apparent subsequently.

As may be seen in FIGURE 7g, in the absence of a flow signal on the control grid 588, the gating tube 572 will conduct a greater current than the balance tube 560 and, as a result, during the sample period 213 the voltage on the plate 592 will dip by an amount of approximately 10 volts below when the tube 560 is conducting. This will be the zero line 620 of FIGURE 7g and corresponds to pulse 618d. In the event there is a flow signal present on the grid 588, the amount of this dip will be greater or less, depending upon the polarity and amplitude of the flow signal. Thus, the amplitude and direction of flow will be indicated by the amount and direction of the deviation of the dip from the present level. Pulses 618a, 618b and 618c represent positive flow but of decreasing amounts respectively. Pulses 618d represents zero flow and pulses 618e and 618f represent negative flow.

together are coupled to the input of the detector by condensers 622. The detector includes a D.C. restoring diode 624 and an A.C. to D.C. converter or detector diode 626 which is interconnected with a condenser 628 which will store a D.C. charge which corresponds to the height of the pulses 618, i.e., the flow rate.

The D.C. restoring diode 624 and condenser 628 will in effect clamp the negative peaks 618 at zero and raise the base of the interval between the sampling periods 618 to a higher positive level, the amount thereof being proportional to the height of the negative pulses 618. As a consequence, the charge on the condenser 628 will accumulate according to the graph in FIGURE 7h. The dips 630 correspond to the time of the pulses 618 and, since they are the result of discharging of condenser 628, the amount thereof will correspond to the time constant of the circuit. The time constant is controlled by the setting of the frequency response switch 40.

The frequency response switch 40 is effective to select the condenser 628 in the circuit with resistor 632. The frequency response of the demodulator may be varied over a range of approximately 0.1 cycle per second to about 150 cycles per second. At the low response limit the flow signal will be integrated to provide a signal representing the average flow over an extended number of pulsations. However, at the higher response rates, the various fluctuations occurring in the flow at the rate of several per pulsation may be passed therethrough.

The overall gain of the present meter 10 is very high and it is possible for noise to be accumulated with the signal and contribute to erroneous readings. Accordingly, to reduce or eliminate such erroneous indications resulting from noises which are above the signal frequency, the output of the demodulator 508 may in turn be directly connected to a low pass filter 510 which comprises a cathode follower 634 having a filter network 636 leading from the cathode 637 to ground and filter network 638 which couples from the cathode 637 directly to the control grid 640 of a succeeding stage of a cathode follower 642. The filter 510 is adapted to pass only those signals having a frequency below 150 cycles per second or the upper frequency response limit of the demodulator when the frequency control is set at its maximum. This filter 510 preferably has a very sharp cut-off. For example, although there may be little or no attenuation at 150 cycles per second, at 200 cycles per second the attenuation may be very high. Thus, if any spurious signals or noises at frequencies of about 150 cycles per second are present in the signal, they will be suppressed from the signal and will not affect the reading of the meter.

The cathode 644 of the cathode follower 642 is connected to a pair of voltage-dividing resistor networks 646 and 648. The first network 646 extends from the cathode 644 to ground. The meter 24 may be connected across the lower resistor with the face of the meter 24 being visible from the front panel 22. This meter 24 will be effective to indicate the amplitude of the voltage at the cathode follower 642. Within the capabilities of the inertial limits of the meter movement and the response of the frequency control the indication will be of the instantaneous rate of flow.

The second voltage dividing network 648 includes a pair of resistors, at least one 650 of which is variable. The center point of the divider 648 is interconnected with one input 552 to a differential amplifier 654 which is adapted to amplify the difference between the signals on the two inputs 652 and 656. The output 658 from the amplifier 654 is connected to one input of a flip-flop 660. The output 658 is also connected to a plurality of condensers 666, 668 and 670, the opposite sides of which are connected to the fixed contacts in switch 662. The movable contact is mechanically connected to control knob 38 on the front panel 22 and electrically connected to a resistor 664 leading back to the second input 656 to the amplifier 654.

Since the amplifier 654 will amplify the difference between the two signals at the inputs 652 and 654, if a flow rate signal is fed onto one of the inputs 652, there will be a difference which the amplifier 654 will amplify and this difference signal will be present on the output 658. This difference will tend to charge one of the condensers 666, 668 or 670, depending upon which one is selected by the switch. Because of the time constant of the condenser and the resistor 664, this circuit will act as a so-called Miller integrator 678 and the charge on the condenser will build up at a rate which is in some predetermined relation to the amplitude of the flow rate signal.

When the lever reaches some preset, fixed amount, it will trip the flip-flop and cause the flip-flop to switch states.

A relay coil 672 is provided in the plate circuit of one of the tubes of the flip-flop 660. This relay is effective to control the contacts 674 and 676. The contacts 674 are connected to the input 656 and when closed will cause the Miller integrator 678 to return to zero and proceed to again integrate up to the predetermined level required to trip the flip-flop. The contacts 676 control the coil in the counter 26 and are effective to cause the counter to advance one count whenever they are closed.

In order to employ the present flow meter, a pickup probe 16 suitable for the blood vessel on which it is to be employed is interconnected with the control unit 18 by means of the cable 19. The control unit 18 is then calibrated to correspond to the pickup probe by adjusting the control knob 42 so that the setting on dial 360 corresponds to the number 358 on the probe 16. This varies the resistance of the resistor 359 in third stage of amplification to alter the amount of feedback within the stage. Thus, the overall gain of the meter will correspond to the sensitivity of the pickup probe 16.

Following this, and while there is no flow through the probe 16, the control knob 34 is adjusted to provide a zero reading on the meter 24. The probe 16 may then be attached to the blood vessel 12 by inserting the vessel 12 into the passage 54 extending through the probe 16. Following this, the control switch 36 may be adjusted until the sensitivity is high enough to provide a large scale defection of the indicating needle on the meter 24. In the event it is desired to obtain an indication as to the total volume of flow over a given interval of time, the required sensitivity of the counter 22 is set by adjustment of the control knob 38 and the counter 26 is reset to zero by pushing the button 44. The integrator circuit will then gradually accumulate a charge and periodically trigger the flip-flop. This will trip the relay and simultaneously reset the integrator to zero and advance the counter 26 one digit.

What is claimed is:

In a flow meter for measuring the flow of a fluid pulsating through a conduit within a predetermined frequency range the combination of means for providing a flux field in said fluid so that movement of said fluid through said field will generate a voltage between diametrically opposite sides of said conduit, said field having a flux density which varies as a square wave and at a frequency which is above the range of frequencies at which said fluid pulsates, a pair of electrodes adapted to engage said conduit at said opposite sides for sensing said voltage to provide a signal proportional to the flow of said fluid, high pass filter means for suppressing signals in said first range of frequencies and for passing signals in a frequency range including the frequency of said flux field, gating means operatively interconnected with said additional filter means for sampling the filtered signal once during each cycle, and filter means having a frequency roll off to compensate for distortion of transients passed by said high pass filter so that said transients in said signals will be substantially equal to zero during the middle of said sampling period, and D.C. responsive means for measuring the filtered signals to provide an indication of said flow.

References Cited by the Examiner

UNITED STATES PATENTS

| | | | |
|---|---|---|---|
| 2,722,122 | 11/55 | Soffel | 73—194 |
| 2,729,103 | 1/56 | Raynsford et al. | 73—194 |
| 2,741,121 | 4/56 | Raynsford | 73—194 |
| 2,808,723 | 10/57 | Buntenbach | 73—194 |
| 2,887,878 | 5/59 | Kamp et al. | 73—194 |
| 3,002,383 | 10/61 | Mittelmann | 73—194 |

OTHER REFERENCES

Article by: Denison et al., "Square Wave Electromagnetic Flowmeter," published in Circulation Research, vol. III, January 1955, pp. 39–46.

Article: Induction Flowmeter, by W. G. James, published in Review of Scientific Instruments, vol. 22, No. 12, December 1955, pp. 989–1002.

Articles: Published in IRE Transactions on Medical Electronics, December 1959, pages 210–240:

(1) "Square Wave Electromagnetic Flowmeter—" by Spencer & Dennison, pages 220–227;

(2) "Gated Sine Wave Electromagnetic Flowmeter," by A. Westersten et al., pages 213–216;

(3) "Magnetic Flowmeter for Recording Cardiac Output," by H. W. Shirer et al., pages 232–234.

RICHARD C. QUEISSER, *Primary Examiner.*